Patented May 31, 1932

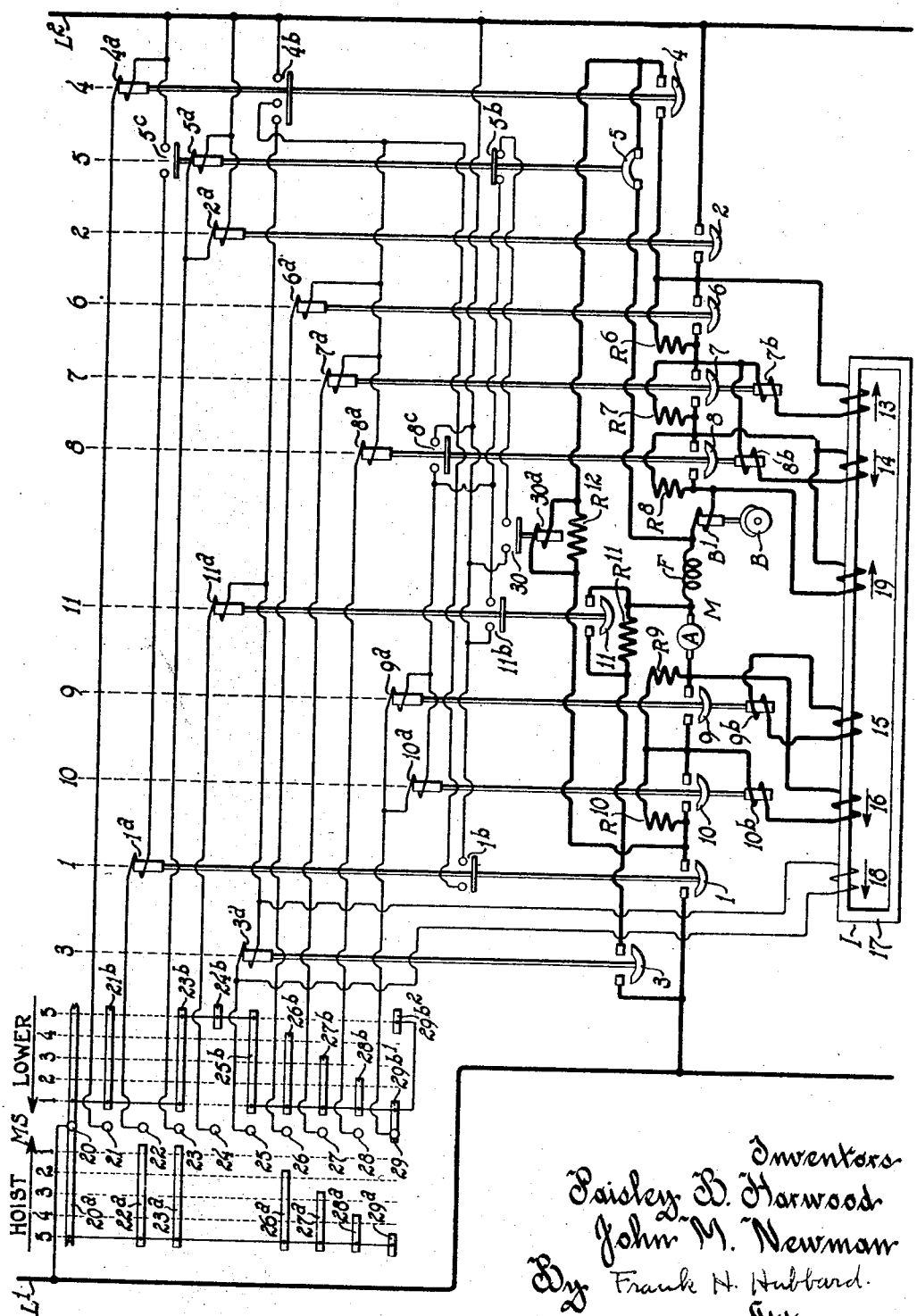

1,860,671

UNITED STATES PATENT OFFICE

PAISLEY B. HARWOOD AND JOHN M. NEWMAN, OF MILWAUKEE, WISCONSIN, ASSIGNORS TO CUTLER-HAMMER, INC., OF MILWAUKEE, WISCONSIN, A CORPORATION OF DELAWARE

CONTROLLER FOR ELECTRIC MOTORS

Application filed December 26, 1929. Serial No. 416,360.

This invention relates to controllers for electric motors.

While not limited thereto the invention is particularly applicable to controllers for direct current motors employed in cranes, hoists or similar apparatus.

In such apparatus the motor is usually operated as a series motor during hoisting operations and as a shunt motor during lowering operations. During lowering operations the motor is adapted to effect dynamic braking under over-hauling load conditions and it is the usual practice to regulate the braking effect by means of the resistance which is employed to effect acceleration of the motor during hoisting operations.

Acceleration control of direct current motors has heretofore been effected in a very efficient and reliable manner by what are known as inductive time limit controllers, a controller of this type being disclosed in the patent to Frank J. Russell, No. 1,681,435, of August 21, 1928. This type of controller can be advantageously used for hoist or crane service to effect acceleration control during hoisting operations, but as heretofore designed such controllers were not adapted to effect the required control during lowering operations.

The present invention has among its objects to provide an improved controller of the inductive time limit type for apparatus of the aforesaid character which is adapted to effect the necessary control during hoisting and also lowering operations in a reliable and efficient manner.

Various other objects and advantages of the invention will hereinafter appear.

The accompanying drawing diagrammatically illustrates an embodiment of the invention which will now be described, it being understood that the embodiment illustrated may be modified in certain respects without departing from the spirit and scope of the appended claims.

Referring to the drawing, the same illustrates a direct current motor M for operating apparatus such as a crane or hoist. The supply circuit for said motor is indicated by lines $L^1$—$L^2$ and the same is provided with an armature A and a series field winding F. Also as is the usual practice the motor is provided with a brake B which is normally applied and is releasable by a magnet coil $B^1$ connected in series with the motor.

The controller illustrated includes normally open electroresponsive switches 1 to 4, inclusive, which are selectively controlled as hereinafter set forth to establish connections for operation of motor M as a series motor during hoisting operations and as a shunt motor during lowering operations. Also the controller includes a normally closed electroresponsive switch 5 which is adapted as hereinafter set forth to establish a dynamic braking circuit for the motor when the controller is in off position.

Resistances $R^6$ to $R^{10}$, inclusive, are provided for controlling the current in the motor circuit during hoisting operations, and said resistances together with resistances $R^{11}$ and $R^{12}$ also provide for control of the current in the motor circuit during lowering operations. Each of the resistances $R^6$ to $R^{11}$, inclusive, has a normally open electroresponsive switch associated therewith for excluding the same from the motor circuit, said switches being indicated by reference numerals 6 to 11, inclusive.

Each of the switches 1 to 11, inclusive, is provided with an operating winding designated by reference character $a$ and as hereinafter set forth all of said windings are under the control of a master switch MS. Also each of the resistance controlling switches 7, 8, 9 and 10 is provided with a restraining winding designated by reference character $b$. Restraining windings $7^b$, $8^b$, $9^b$ and $10^b$ are associated with coils 13, 14, 15 and 16, respectively, of an inductor I, all of said coils being mounted upon a common core member 17. Inductor coil 13 is connected in shunt with resistance $R^6$ and in series with its associated restraining winding $7^b$. Inductor coil 14 is connected in shunt with resistance $R^7$ and in series with its associated restraining winding $8^b$. Inductor coil 15 is connected directly across the terminals of its associated restraining winding $9^b$ while inductor winding 16 is connected in shunt with resistance $R^9$ and in series with its associated restraining winding $10^b$. Inductor I also has coils 18 and 19 mounted on the core member thereof, the latter coil being connected in shunt with resistance $R^8$ and the former being controlled as hereinafter set forth by the master switch MS.

As shown, the master switch MS includes a contact drum which is movable in opposite directions out of an intermediate off position to effect raising and lowering operations. Said contact drum cooperates with a series of stationary contacts 20 to 29, inclusive, and the same is provided with a set of contact segments $22^a$, $23^a$, $26^a$, $27^a$, $28^a$ and $29^a$ for hoisting, and a set of contact segments $21^b$, $23^b$, $24^b$, $25^b$, $26^b$, $27^b$, $28^b$, $29^{b1}$ and $29^{b2}$ for lowering. All of said contact segments are connected to a contact segment $20^a$ on the drum and said segment is connected by contact 20 to one side of the supply circuit indicated by lines $L^1$ and $L^2$.

In addition to the aforedescribed control means the controller includes a normally open voltage relay 30 having an operating winding $30^a$ connected in shunt with resistance $R^{12}$. Said relay serves as hereinafter set forth under certain conditions to control resistance controlling switches 9 and 10. Also for purposes hereinafter set forth switches 1 and 4 are each provided with normally open auxiliary contacts designated by reference character "$b$"; dynamic braking switch 5 is provided with normally closed auxiliary contacts designated by reference character "$d$" and normally open auxiliary contacts designated by reference character "$c$", and resistance controlling switches 8 and 11 are each provided with normally open auxiliary contacts designated by reference character "$c$".

As thus constructed and arranged the operation of the aforedescribed controller is as follows. Upon movement of the master switch MS towards the right hand into its first hoisting position the operating windings $a$ of switch 2 and dynamic braking switch 5 are connected in parallel across lines $L^1$—$L^2$ through the medium of stationary contact 23 and its cooperating contact segment $23^a$. Switches 2 and 5 thus respond and upon response of the latter switch the auxiliary contacts $5^c$ thereof connect the operating winding $1^a$ of switch 1 across lines $L^1$—$L^2$ through the medium of contacts 22 and $22^a$ of the master switch. Switches 1 and 2 in responding connect the armature A and field winding F of the motor in series across lines $L^1$—$L^2$ through resistances $R^6$ to $R^{10}$, inclusive, and the brake operating coil $B^1$. The motor is thus energized for operation in its hoisting direction, the brake B being released by its operating coil $B^1$.

Upon establishment of the aforedescribed connections for the motor, inductor coils 13, 14, 19 and 16 are energized by currents which are a function of the voltage drop across resistances $R^6$, $R^7$, $R^8$ and $R^9$, respectively. As indicated by arrows coils 13 and 19 of the inductor are arranged so that the magneto-motive forces thereof act in opposition to the magneto-motive forces of inductor coils 14 and 16, and the arrangement is such that coils 13 and 19 predominate over coils 14 and 16 to produce a flux in the core member of inductor I.

Upon movement of the master switch MS into its second hoisting position resistance controlling switch 6 closes immediately, the operating winding $6^a$ thereof being energized through the medium of auxiliary contacts $1^b$ of line switch 1 and contacts 26 and $26^a$ of the master switch. Switch 6 in responding shunts resistance $R^6$ and inductor coil 13 and connects the restraining winding $7^b$ of resistance controlling switch 7 directly across said inductor coil. Shunting of resistance $R^6$ and inductor coil 13 by switch 6 causes a variation in flux in core member 17 and a transient current is thus produced in said coil the value of which is a function of the degree and rate of such flux change. In the embodiment illustrated inductor coils 14 and 16 are adapted to act in opposition to inductor coil 19 to reverse the direction of the flux in core 17. A relatively large transient current is thus produced in coil 13 which passes through restraining winding $7^b$ to insure a delay in closure of resistance controlling switch 7 under the action of its operating winding $a$ immediately following closure of switch 6. The operating winding $a$ of resistance controlling switch 7 is energized upon movement of the master switch MS into its third hoisting position through the medium of auxiliary contacts $1^b$ of switch 1 and master switch contacts 27 and $27^a$.

Resistance controlling switch 7 in responding shunts resistance $R^7$ and inductor coil 14 and connects the restraining winding $8^b$ of resistance controlling switch 8 directly across said inductor coil. Upon shunting of resistance $R^7$ and inductor coil 14 a variation in flux occurs in the inductor core 17 and a transient current is thus produed in inductor coil 14, the value of which is a function of the degree and rate of such flux change. Inductor coil 19 is now adapted to act in opposition to inductor coil 16 to reverse the direction of the flux in inductor core 17. A relatively large transient current is thus produced in inductor coil 14 which passes through restraining winding $8^b$ to insure a delay in closure of resistance controlling switch 8 under the action of its operating winding $a$ immediately following closure of resistance controlling switch 7. Movement of the master switch into its fourth hoisting position energizes the operating winding $8^a$ of resistance controlling switch 8 through the medium of contacts 28 and 28ª of said master switch and auxiliary contacts 1ᵇ of switch 1.

Resistance controlling switch 8 in closing shunts resistance R⁸ and inductor coil 19 and this results in a variation in flux in inductor core 17. A transient current is thus produced in inductor coil 15, the value of which is a function of the degree and rate of such flux change. Inductor coil 16 now acts to reverse the direction of the flux in the inductor core 17 to thereby produce a relatively wide flux variation. The transient current produced in inductor coil 15 passes through restraining winding 9ᵇ to insure a delay in closure of resistance controlling switch 9 by its operating winding $a$ following closure of resistance controlling switch 8. Movement of the master switch MS into its fifth hoisting position energizes the operating winding 9ª of resistance controlling switch 9 and also the operating winding 10ª of resistance controlling switch 10 through the medium of contacts 29 and 29ª and auxiliary contacts 8ᶜ associated with resistance controlling switch 8.

Resistance controlling switch 9 in closing shunts resistance R⁹ and inductor coil 16 and connects the restraining winding 10ᵇ of resistance controlling switch 10 directly across said inductor coil. The flux in inductor core 17 now drops to zero and a transient current is thus produced in coil 16 which passes through restraining winding 10ᵇ to insure a delay in closure of resistance controlling switch 10 upon energization of its operating winding $a$ by the master switch MS.

Assuming now that the master switch MS is moved into its first lowering position, the operating windings $a$ of switches 2 and 5 are energized through the medium of contacts 23 and 23ᵇ; the operating winding $a$ of switch 4 is energized through the medium of contacts 21 and 21ᵇ while the operating winding $a$ of switch 3 is energized through the medium of contacts 25 and 25ᵇ and auxiliary contacts 4ᵇ of switch 4. Also with the master switch MS in its first lowering position contacts 26, 27 and 28 engage their cooperating contact segments $b$ to energize the operating windings $a$ of resistance controlling switches 6, 7 and 8 through the medium of auxiliary contacts 4ᵇ of switch 4 while contact 29 engages its cooperating contact segment 29ᵇ¹ to energize the operating windings $a$ of resistance controlling switches 9 and 10 through the medium of auxiliary contacts 8ᶜ associated with resistance controlling switch 8. Resistances R⁶ to R¹⁰, inclusive, are now shunted by their associated control switches, and as is apparent the field winding F and brake coil B¹ are connected in series across lines L¹—L² through the medium of switches 2 and 3 and resistance R¹¹ while the armature A is connected in parallel with the series field winding F and brake coil B¹ through the medium of switch 4 and resistance R¹².

Current from the line is adapted to pass through two parallel paths, one extending through the field winding F and brake coil B¹ and the other through the motor armature A. A field is thus set up and the brake released and current from the supply circuit passes through the motor armature A to cause it to revolve in its lowering direction. The armature takes current from the supply circuit L¹—L² and runs as a motor only so long as the load does not tend to overhaul it, but under overhauling load conditions the motor acts as a generator and produces a dynamic braking current in the closed circuit extending through switch 4 and including armature A, series field F and brake coil B¹. To increase the lowering speed of the motor, resistances R⁶ to R¹⁰, inclusive, are progressively included in the dynamic braking circuit and to decrease the lowering speed said resistances are excluded from said circuit.

As is apparent upon movement of the master switch MS towards the left into its second lowering position the operating windings $a$ of resistance controlling switches 9 and 10 are deenergized and said control switches drop out to include resistances R⁹ and R¹⁰ in the dynamic braking circuit of the motor. Also as is apparent upon movement of the master switch MS towards the left through its second, third and fourth speed positions the operating windings 8ª, 7ª and 6ª are deenergized in the order named and resistance controlling switches 8, 7 and 6 drop out to include resistances R⁸, R⁷ and R⁶ in the dynamic braking circuit of the motor. When the master switch MS is moved into its fifth lowering position resistance controlling switch 11 is energized through the medium of auxiliary contacts 4ᵇ of switch 4, contacts 24 and 24ᵇ of the master switch. Upon closure of switch 11 resistance R¹¹ is excluded from the motor circuit and resistance controlling switches 9 and 10 are again energized through the medium of the auxiliary contacts 11ᵇ and master switch contacts 29 and 29ᵇ² to again exclude resistances R⁹ and R¹⁰ from the dynamic braking circuit of the motor.

Upon movement of the master switch MS out of its fifth lowering position resistance controlling switches 9, 10 and 11 drop out and during return of said master switch to its first lowering position connections are reestablished for energization of the operating windings $a$ of resistance controlling switches 6 to 10, inclusive. As will now be set forth during lowering operations inductor I acts to supply the restraining windings $b$ of switches 7, 8, 9 and 10 with transient currents to delay closure of said switches under the action of their operating windings $a$.

It will be noted that when the master switch MS is in its fifth lowering position inductor coils 13, 14 and 19 are energized by currents which are a function of the voltage drop across resistances $R^6$, $R^7$ and $R^8$, respectively, and when said master switch is moved into its fourth lowering position inductor coil 16 is energized by current which is a function of the voltage drop across resistance $R^9$. The direction of the current through armature A, series field winding F and brake coil B is the same during dynamic braking as during hoisting. Thus upon slowdown operation of the controller during lowering inductor I is adapted to act in the manner hereinbefore described in connection with the hoisting operation of the controller to supply the restraining windings $7^b$, $8^b$, $9^b$ and $10^b$ with inherently transient currents to delay closure of resistance controlling switches 7, 8, 9 and 10.

As hereinbefore set forth during hoisting operations inductor I is adapted to supply the restraining windings b of resistance controlling switches 7, 8, 9 and 10 with relatively large transient currents to delay closure of each of said switches for a relatively long period. However, during lowering operations it is desirable to shorten the delay in closure of resistance controlling switches 7, 8, 9 and 10 in order to obtain large inrushes of current in the dynamic braking circuit for quick stopping of the load.

For this purpose coil 18 of inductor I is arranged to be connected across lines $L^1$—$L^2$ by contacts 25 and $25^b$ of the master switch in all lowering positions of the latter. When energized coil 18 produces a magneto-motive force in the direction indicated by its associated arrow the same produces a flux which is sufficient to substantially saturate inductor core 17. With winding 18 energized the flux variations produced in core 17 upon closure of resistance controlling switches 6, 7, 8 and 9 are relatively small and no reversal in the direction of the flux can occur as in hoisting. Thus during lowering operations the restraining windings "b" of switches 7, 8, 9 and 10 are supplied with transient currents which are of smaller value than those supplied to said windings during hoisting operations and the delay in closure of said switches is therefore less during lowering than during hoisting.

Assuming now that the master switch MS is moved to off position from one of its lowering positions while resistance controlling switches 9 and 10 are in open position. Switches 2, 3, 4 and 5 are then deenergized and the latter switch establishes a dynamic braking circuit for the motor including armature A, series field winding F, and resistances $R^9$, $R^{10}$ and $R^{12}$. Also the brake coil $B^1$ is deenergized and relay 30 is held in closed position by its operating winding a which is subjected to the voltage drop across resistance $R^{12}$. With relay 30 closed and the master switch MS in off position the operating windings a of resistance controlling switches 9 and 10 are energized through the medium of auxiliary contacts $5^b$ and master switch contacts $29^a$ and $29^{b1}$.

Upon return of the master switch to off position coil 18 is deenergized and the flux in the core member of inductor I therefore drops to a value which is determined by the value of the flux produced by inductor coil 16. Such change in flux produces a transient current in inductor coil 15 which passes through the restraining winding $9^b$ to delay closure of resistance controlling switch 9.

Closure of resistance controlling switch 9 shunts resistance $R^9$ and inductor coil 16 and connects the restraining winding $10^b$ directly across said coil. The flux in inductor core 17 then drops to zero and a transient current is thus produced in coil 16 which passes through restraining winding $10^b$ to insure a delay in closure of resistance controlling switch 10. When the motor is brought substantially to rest voltage relay 30 drops out to deenergize resistance controlling switches 9 and 10.

What we claim as new and desire to secure by Letters Patent is:

1. In a controller for hoists and the like, the combination with a driving motor, of means for selectively establishing hoisting and lowering connections for said motor, the latter connections providing for dynamic braking of said motor under overhauling load conditions, resistance varying means common to said connections, and control means having an inherently transient effect for arresting the operation of said resistance varying means, said control means including means providing for differentiation of the arresting action thereof during hoisting and lowering operations of said motor.

2. In a controller for hoists and the like, the combination with a driving motor, of means for selectively establishing hoisting and lowering connections for said motor, the latter connections providing for dynamic braking of said motor under overhauling load conditions, resistance varying means common to said connections, and control means having an inherently transient effect for delaying operation of said resistance varying means in different stages thereof, said control means including means for rendering the delaying effect thereof relatively less during lowering operations of said motor than during hoisting operations thereof.

3. In a controller for hoists and the like, the combination with a driving motor, of means for selectively establishing hoisting and lowering connections for said motor, the latter connections providing for dynamic braking of said motor under overhauling load conditions, resistance varying means common to said connections, control means having an inherently transient effect for delaying operation of said resistance varying means in different stages thereof, said control means including a plurality of windings arranged in an inductive relation and each to be included in circuit with said motor in certain of said stages and means adapted to act during lowering operations of said motor to effect a decrease in the mutual inductance of said windings.

4. In a controller for hoists and the like, the combination with a driving motor, of means for selectively establishing hoisting and lowering connections for said motor, the latter connections providing for dynamic braking of said motor under overhauling load conditions, resistance varying means common to said connections, control means to arrest for temporary periods the operation of said resistance varying means in different stages thereof, said control means including an inductor having a core member and a plurality of windings mounted thereon, certain of said windings being connected in shunt across different parts of the motor circuit and being arranged so that the magnetomotive forces thereof are adapted to effect reversal of the direction of the flux in said core member in each of said stages, and means adapted to act only during lowering operations of said motor to prevent reversals of the direction of the flux in said core member by said windings.

5. The combination with a driving motor, of means for selectively establishing hoisting and dynamic lowering connections for said motor, resistance varying means responsive to effect acceleration of said motor during hoisting operations and deceleration thereof during dynamic lowering operations and control means having an inherently transient effect for delaying response of said resistance varying means, said control means including means for rendering the delaying effect thereof relatively less during dynamic lowering operations than during hoisting operations.

6. The combination with a driving motor, of means for selectively establishing hoisting and dynamic lowering connections for said motor, resistance varying means responsive to effect acceleration of said motor during hoisting operations and deceleration thereof during dynamic lowering operations, and control means for arresting the resistance varying action of said former means in different stages thereof, said control means having an inherently transient effect and including means providing for differentiation of its arresting action during hoisting and dynamic lowering operations.

7. The combination with a driving motor, of means for selectively establishing hoisting and dynamic lowering connections for said motor including a resistance, a plurality of switches for excluding said resistance in steps for acceleration of said motor during hoisting operations and for deceleration thereof during dynamic lowering operations, each of said switches having a restraining winding associated therewith, and means including a plurality of inductor coils arranged in an inductive relation and adapted to supply said restraining windings with inherently transient currents to delay operation of said switches, certain of said inductor coils being adapted to vary the mutual inductance of the other of said inductor coils to provide for differentiation of the delay in closure of said switches for hoisting and lowering operations.

8. The combination with a motor, of means for selectively establishing hoisting and dynamic lowering connections for said motor and for also establishing connections for dynamic braking of said motor upon interruption of said dynamic lowering connections, of a resistance common to said connections, means responsive to shunt said resistance to effect acceleration of said motor during hoisting operations and deceleration thereof during lowering operations, and inductive means associated with said last mentioned means for delaying response thereof for a predetermined period during lowering operations and for a relatively longer period during hoisting operations.

9. The combination with a motor, of means for selectively establishing hoisting and dynamic lowering connections for said motor and for also establishing a dynamic braking circuit for said motor upon interruption of said dynamic lowering connections, of a plurality of resistance sections common to said hoisting and dynamic lowering connections, certain of said resistance sections being also common to said dynamic braking circuit, a switch associated with each of said resistance sections for shunting the same, each of said switches having a restraining winding associated therewith, and means including a plurality of inductor coils arranged in an inductive relation and adapted to supply said restraining windings with inherently transient currents to delay operation of said switches, certain of said inductor coils being adapted to effect a given decrease in the mutual inductance of certain other of said inductor coils during lowering operations.

In witness whereof, we have hereunto subscribed our names.

PAISLEY B. HARWOOD.
JOHN M. NEWMAN.